US011208135B2

(12) United States Patent
Haut et al.

(10) Patent No.: US 11,208,135 B2
(45) Date of Patent: Dec. 28, 2021

(54) MULTI CHILD STROLLER

(71) Applicant: Wonderland Switzerland AG, Steinhausen (CH)

(72) Inventors: Robert E. Haut, Merion Station, PA (US); Andrew J. Horst, West Lawn, PA (US)

(73) Assignee: Wonderland Switzerland AG, Steinhausen (CH)

( * ) Notice: Subject to any disclaimer, the term of this patent is extended or adjusted under 35 U.S.C. 154(b) by 0 days.

(21) Appl. No.: 16/868,546

(22) Filed: May 7, 2020

(65) Prior Publication Data
US 2020/0353964 A1 Nov. 12, 2020

Related U.S. Application Data

(60) Provisional application No. 62/844,333, filed on May 7, 2019.

(51) Int. Cl.
*B62B 7/00* (2006.01)
(52) U.S. Cl.
CPC .................... *B62B 7/008* (2013.01)
(58) Field of Classification Search
CPC ...................................................... B62G 7/008
See application file for complete search history.

(56) References Cited

U.S. PATENT DOCUMENTS

| | | | |
|---|---|---|---|
| 2,783,053 A | 2/1957 | Sheldrick | |
| 3,235,279 A | 2/1966 | Smith | |
| 3,998,490 A | 12/1976 | Lallave | |
| 5,104,180 A | 4/1992 | Takahashi | |
| 5,333,893 A * | 8/1994 | Chen | B62B 7/08 108/177 |
| 5,338,096 A * | 8/1994 | Huang | B62B 7/142 280/30 |
| 5,417,449 A * | 5/1995 | Shamie | B62B 7/06 280/47.35 |
| 5,938,229 A | 8/1999 | Chen | |
| 6,086,087 A | 7/2000 | Yang | |
| 6,412,809 B1 | 7/2002 | Bigo | |
| 9,227,650 B2 | 1/2016 | Gillett | |

(Continued)

FOREIGN PATENT DOCUMENTS

| | | |
|---|---|---|
| CN | 1299758 A | 6/2001 |
| CN | 2635486 Y | 8/2004 |

(Continued)

*Primary Examiner* — Erez Gurari
(74) *Attorney, Agent, or Firm* — Winston Hsu

(57) ABSTRACT

A multi child stroller includes a stroller frame, a first seat and a second seat. The stroller frame includes a front section member, a rear section member, a driving member and a handle member. The driving member is movably connected to the rear section member. An end of the handle member is rotatably connected to the front section member, and a segment of the handle member adjacent to the foresaid end is rotatably connected to the rear section member. When the front section member and the handle member are rotated relative to each other, the driving member is rotated relative to the rear section member, the first link is utilized to rotate the first seat back relative to the first seat body, and the second seat body is utilized to rotate the second seat back relative to the second link.

17 Claims, 6 Drawing Sheets

(56) References Cited

U.S. PATENT DOCUMENTS

| | | | |
|---|---|---|---|
| 9,399,477 | B2 | 7/2016 | Iftinca |
| 9,517,787 | B2 | 12/2016 | Zehfuss |
| 9,849,903 | B1 | 12/2017 | Lai |
| 10,293,843 | B2 | 5/2019 | Naslain |
| 2003/0227157 | A1* | 12/2003 | Bretschger ............... B62B 7/083 280/642 |
| 2004/0094935 | A1* | 5/2004 | Fair ........................ B62B 9/14 280/642 |
| 2010/0038886 | A1* | 2/2010 | Greger ................. B60N 2/2821 280/642 |
| 2011/0031708 | A1* | 2/2011 | Cheng .................... B62B 7/142 280/47.38 |
| 2011/0175306 | A1 | 7/2011 | Newhard |
| 2014/0021697 | A1* | 1/2014 | Kikui ...................... B62B 7/042 280/642 |
| 2016/0229439 | A1 | 8/2016 | Zhong |
| 2018/0201291 | A1* | 7/2018 | Liu ........................ B62B 7/145 |
| 2018/0244295 | A1 | 8/2018 | Storm |
| 2019/0210628 | A1* | 7/2019 | Zhao .................... B62B 9/26 |
| 2020/0353966 | A1* | 11/2020 | Taylor .................... B62B 7/145 |

FOREIGN PATENT DOCUMENTS

| | | |
|---|---|---|
| CN | 108248661 A | 7/2018 |
| CN | 108583670 A | 9/2018 |
| GB | 2 163 644 A | 3/1986 |
| GB | 2 392 886 A | 3/2004 |
| GB | 2481138 A | 12/2011 |
| GB | 2523251 A | 8/2015 |
| GB | 2550022 A | 11/2017 |

\* cited by examiner

MULTI CHILD STROLLER

CROSS REFERENCE TO RELATED APPLICATION

This application claims the benefit of U.S. provisional application No. 62/844,333, filed on May 7, 2019, which is all incorporated herein by reference.

BACKGROUND OF THE INVENTION

1. Field of the Invention

The present invention relates to a multi child stroller, and more particularly, to a multi child stroller capable of compactly storing the stroller and seats in the folding mode.

2. Description of the Prior Art

A conventional double child stroller includes a plurality of structural components assembled in a complicated manner, and requires removal of some structural components before folding the double child stroller into a compact mode. The conventional double child stroller typically has a large folded size and has a drawback of inconvenient storage. Another conventional double child stroller that can be folded more compactly has drawbacks of a minimal seat for the occupant and smaller basket storage, and does not offer a raised seat for a younger child to be near the parent.

SUMMARY OF THE INVENTION

The present invention provides a multi child stroller capable of compactly storing the stroller and seats in the folding mode for solving above drawbacks.

According to the claimed invention, a multi child stroller includes a stroller frame, a first seat and a second seat. The stroller frame can be switched to a folding mode and a service mode. The stroller frame includes a front section member, a rear section member, a driving member and a handle member. The driving member is movably connected to the rear section member. An end of the handle member is rotatably connected to the front section member, and a segment of the handle member adjacent to the foresaid end is rotatably connected to the rear section member. The first seat includes a first seat back, a first seat body and a first link. Two ends of the first body are respectively connected to the driving component and a bottom of the first seat back in a rotatable manner. Two ends of the first link are respectively connected to the driving component and the first seat back in a rotatable manner. The second seat includes a second seat back, a second seat body and a second link. The second seat body is detachably and rotatably connected to a bottom of the second seat back. The second seat body is stretched from the driving component. A first end of the second link is rotatably connected to the second seat back, and a second end of the second link is rotatably connected to connection of the rear section member and the handle member. When the front section member and the handle member are rotated relative to each other, the driving member is rotated relative to the rear section member, the first link is utilized to rotate the first seat back relative to the first seat body, and the second seat body is utilized to rotate the second seat back relative to the second link.

According to the claimed invention, the driving member is rotatably connected to a rear leg member and is slidably connected to the rear section member.

According to the claimed invention, the rear section member includes a sliding connection portion where the driving member passes. The driving member is supported by the sliding connection portion and slides relative to the rear section member.

According to the claimed invention, the driving member is assembled with the front section member, the rear section member and the handle member to form a four-bar linkage mechanism.

According to the claimed invention, the stroller frame further includes a rear leg member rotatably connected to the front section member and the rear section member.

According to the claimed invention, the first seat body is slidably connected to the front section member.

According to the claimed invention, the first seat body includes a sliding slot, and the front section member includes a connecting portion slidably disposed inside the sliding slot for changing relative position between the front section member and the first seat body.

According to the claimed invention, the first seat further includes a first tray, and a rear end of the first tray is rotatably connected to the front section member.

According to the claimed invention, the first tray is lowered to abut against the front section member when the multi child stroller is switched from the service mode to the folding mode.

According to the claimed invention, the first seat further includes a first tray linking component. Two ends of the first tray linking component are respectively connected to the first tray and the driving member in a rotatably manner.

According to the claimed invention, the first link moves the first seat back close to the first seat body when the stroller frame is in the folding mode.

According to the claimed invention, the first link holds the first seat back at a specific inclined angle when the stroller frame is in the service mode.

According to the claimed invention, the second seat body is integrated with a main section of the driving member monolithically, or fixed to the main section of the driving member.

According to the claimed invention, the second link moves the second seat back close to the second seat body when the stroller frame is in the folding mode.

According to the claimed invention, the second link holds the second seat back at a specific inclined angle when the stroller frame is in the service mode.

According to the claimed invention, the second seat is a bench seat of the multi child stroller when the second seat back and the second link are removed.

According to the claimed invention, the multi child stroller further comprises a stand platform disposed on the rear leg member.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
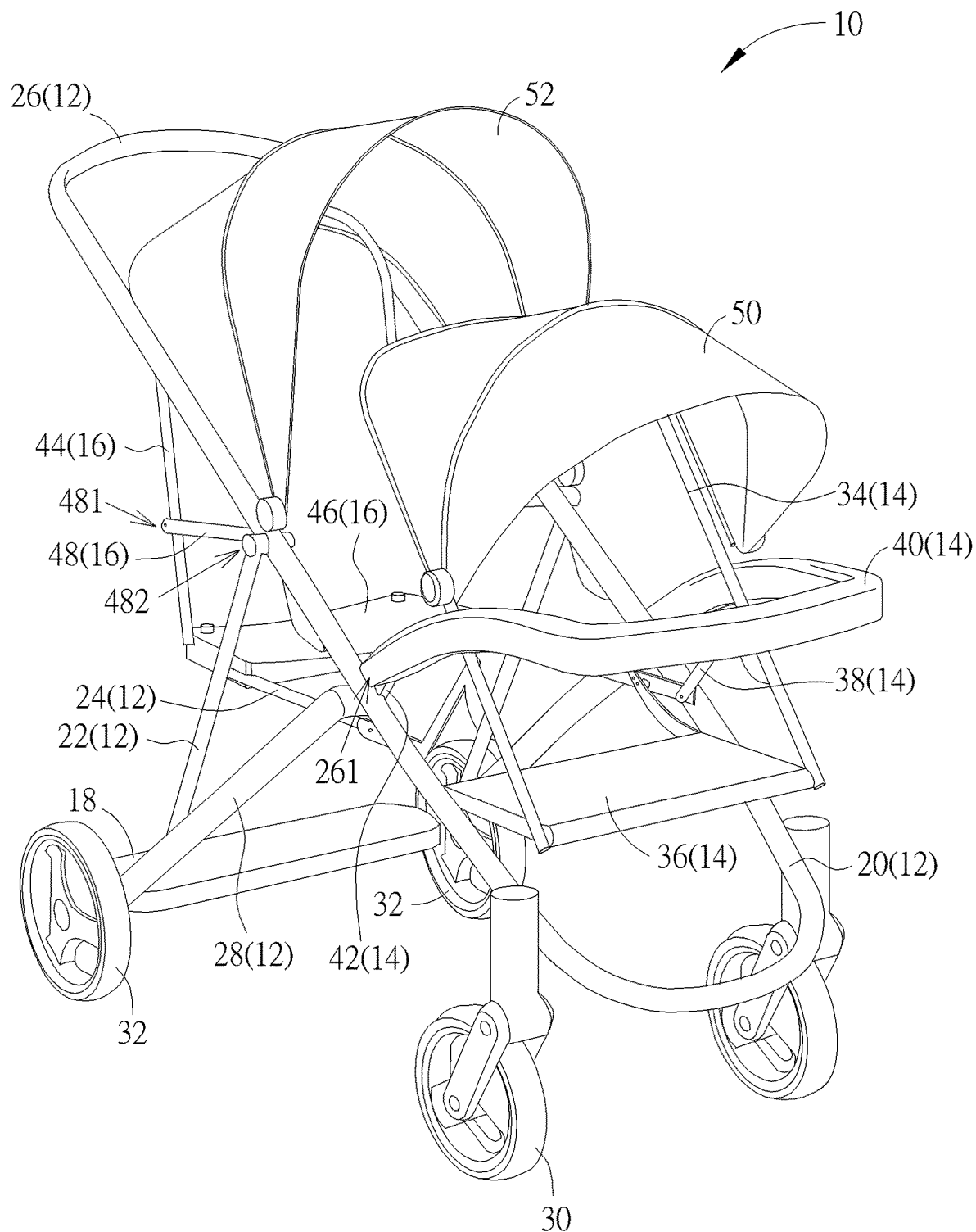
FIG. 1 is a schematic diagram of a multi child stroller in a service mode according to an embodiment of the present invention.
Figure 2:
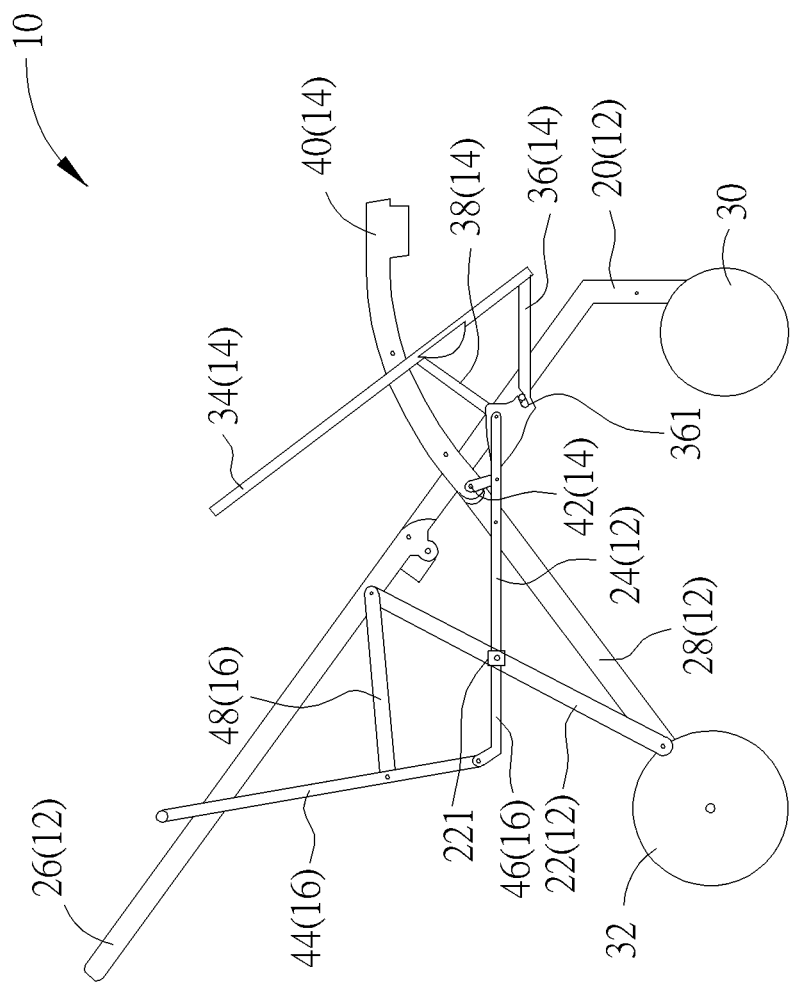
FIG. 2 is a structural diagram of the multi child stroller according to the embodiment of the present invention.

Please refer to FIG. 1 and FIG. 2. FIG. 1 is a schematic diagram of a multi child stroller 10 in a service mode according to an embodiment of the present invention. FIG. 2 is a structural diagram of the multi child stroller 10 according to the embodiment of the present invention. The multi child stroller 10 can include a stroller frame 12, a first seat 14, a second seat 16 and a stand platform 18. The first seat 14, the second seat 16 and the stand platform 18 can be disposed on the stroller frame 12. In response to the stroller frame 12 switched between a folding mode and a service mode, components of the first seat 14 and the second seat 16 can be folded or unfolded accordingly, and the multi child stroller 10 can provide sufficient seat space in the service mode and a small size in the folding mode.

The stroller frame 12 can include a front section member 20, a rear section member 22, a driving member 24, a handle member 26 and a rear leg member 28. The driving member 24 can be movably disposed on the rear section member 22. An end 261 of the handle member 26 can be rotatably connected to the front section member 20, and a segment of the handle member 26 adjacent to the end 261 can be rotatably connected to the rear section member 22. The rear leg member 28 can be rotatably connected to the front section member 20 and the rear section member 22. The front section member 20 can have one or several first wheels 30, and the rear leg member 28 can have one or several second wheels 32. In the embodiment, the driving member 24 preferably can be connected to the rear leg member 28 in a rotatable manner, and further connected to the rear section member 22 in a slidable manner. Generally, the rear section member 22 can include a sliding connection portion 221. The driving member 24 can pass through the sliding connection portion 221, and can be supported by the sliding connection portion 221 and then slide relative to the rear section member 22; an actual application about connection between the rear section member 22 and the driving member 24 is not limited to the above-mentioned embodiment, which depends on a design demand. The driving member 24 can be assembled with the front section member 20, the rear section member 22 and the handle member 26 to set as a four-bar linkage mechanism.

The first seat 14 can include a first seat back 34, a first seat body 36, a first link 38, a first tray 40 and a first tray linking component 42. Two ends of the first seat body 36 can be respectively connected to the driving member 24 and a bottom of the first seat back 34 in a rotatable manner. In the embodiment of the present invention, the first seat body 36 may be connected to the front section member 20 in a slidable manner. The first seat body 36 can include a sliding slot 361, and the front section member 20 can include a connecting portion. The connecting portion can slide inside the sliding slot 361 to change relative position between the front section member 20 and the first seat body 36. Two ends of the first link 38 can be respectively connected to the driving member 24 and a middle area of the first seat back 34 adjacent to the first tray 40 in a rotatable manner. A rear end of the first tray 40 can be rotatably connected to the front section member 20. Two ends of the first tray linking component 42 can be respectively connected to the first tray 40 and the driving member 24 in a rotatable manner.

Besides, the second seat 16 can include a second seat back 44, a second seat body 46 and a second link 48. The second seat body 46 can be connected to a bottom of the second seat back 44 in a detachable and rotatable manner. In the embodiment of the present invention, the second seat body 46 may be stretched from the driving member 24, which means the second seat body 46 can be integrated with a main section of the driving member 24 monolithically, or the second seat body 46 and the driving member 24 can be two independent elements and the second seat body 46 can be fixed to the main section of the driving member 24. An actual application of the second seat body 46 and the driving member 24 is not limited to the above-mentioned embodiment, and depends on the design demand. The foresaid main section of the driving member 24 can be a section between the front section member 20 and the rear section member 22. A first end 481 of the second link 48 can be rotatably connected to the second seat back 44, and a second end 482 of the second link 48 can be rotatably connected to connection between the rear section member 22 and the handle member 26.

The first seat 14 can include a first shelter 50 and the second seat 16 can include a second shelter 52. The first shelter 50 can be disposed on the first seat back 34 or the first tray 40 in a rotatable and detachable manner. The second shelter 52 can be disposed on the second link 48 or the handle member 26 in the rotatable and detachable manner. The first shelter 50 and the second shelter 52 are optional elements and not shown in FIG. 2.

Please refer to FIG. 1 to FIG. 5. FIG. 2 to FIG. 5 are diagrams of the multi child stroller 10 switched from the service mode to the folding mode according to the embodiment of the present invention. As shown in FIG. 2, the multi child stroller 10 is in the service mode, and the driving member 24 can be kept in a parallel situation. A right end of the driving member 24 can hold the first seat body 36 of the first seat 14 in the parallel situation, and the first link 38 of the first seat 14 can hold the first seat back 34 at a specific inclined angle. A left end of the driving member 24 can support the second seat body 46 of the second seat 16, and push the second seat back 44 standing behind the second seat body 46, so that the second link 48 of the second seat 16 can hold the second seat back 44 at the specific inclined angle. It should be mentioned that the inclined angle of the first seat back 34 and the second seat back 44 may be the same or different from each other.

Figure 3:
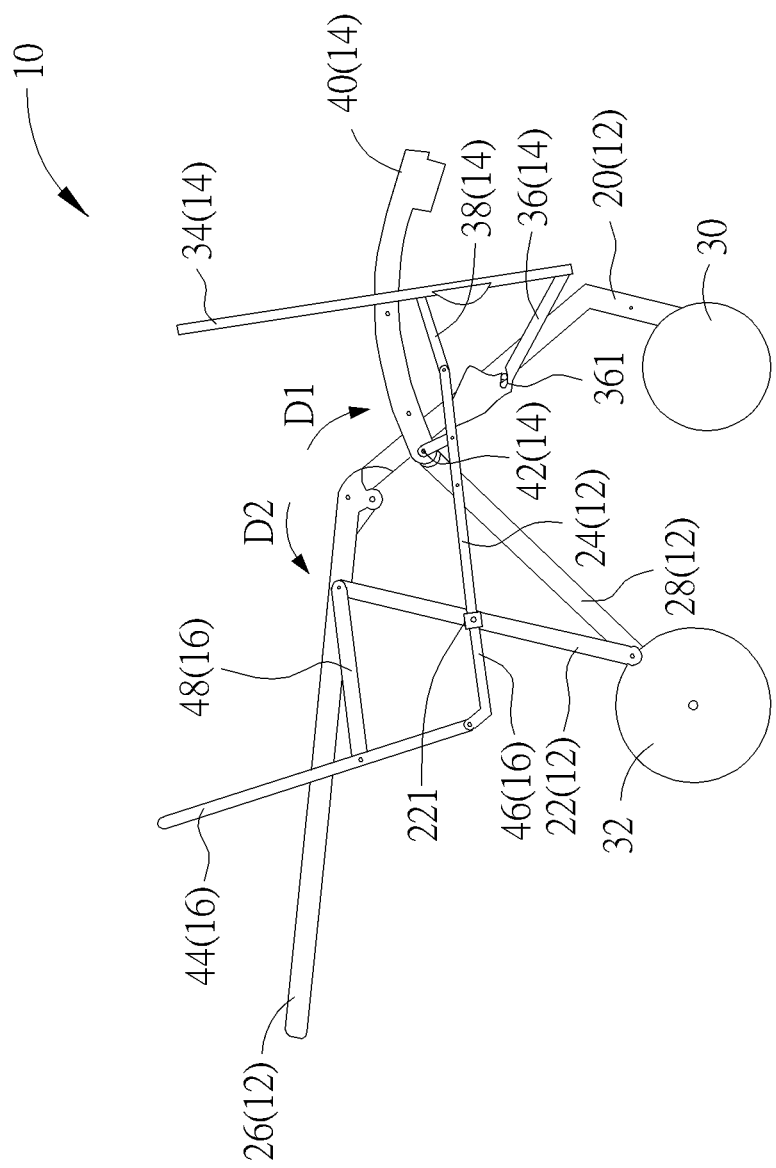
FIG. 3 to FIG. 5 are diagrams of the multi child stroller switched from the service mode to the folding mode according to the embodiment of the present invention.
Figure 4:
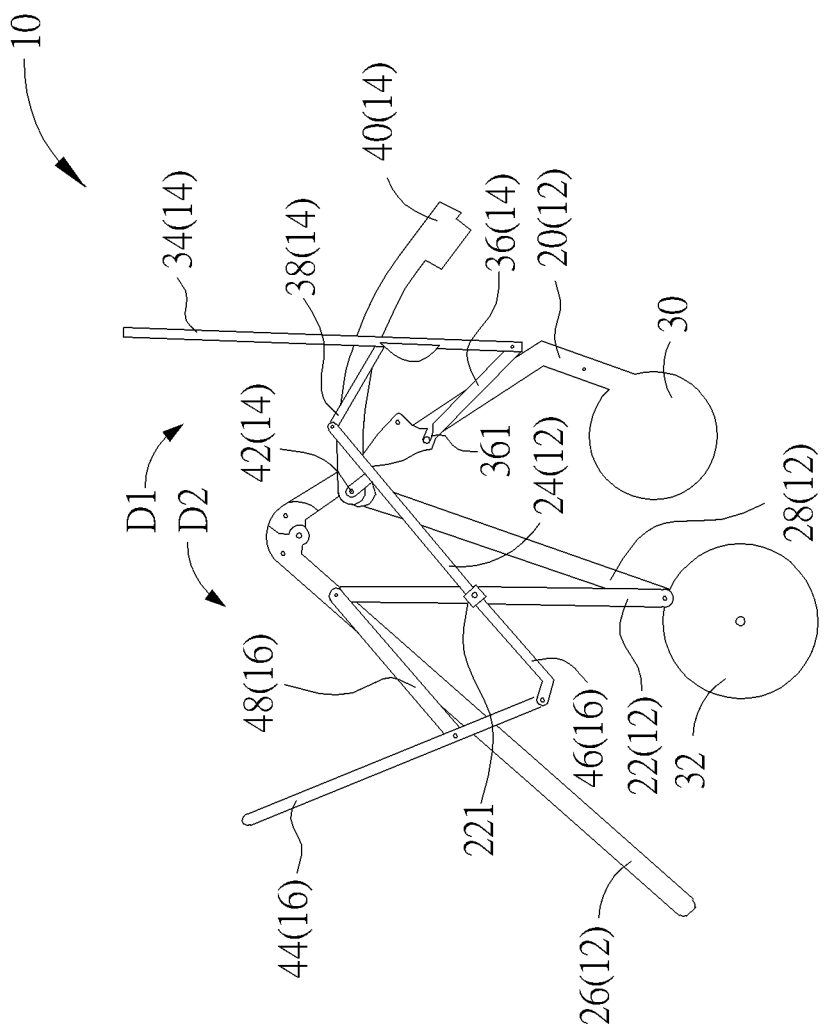
Figure 5:
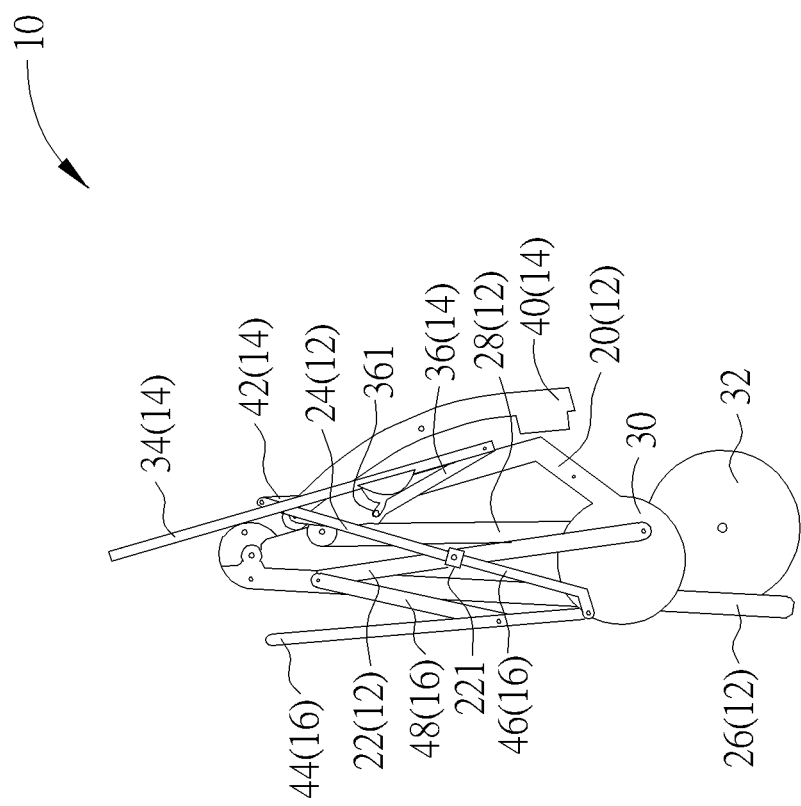

As shown in FIG. 3, when the multi child stroller 10 is prepared to be folded, the connection of the front section member 20 and the handle member 26 can be lifted, and the front section member 20 can be rotated in a first rotation direction D1, and the handle member 26 can be rotated in a second rotation direction D2; meanwhile, the driving member 24 can be rotated relative to the rear leg member 28, and further slid relative to the rear section member 22, so as to fold the first seat 14 and the second seat 16 simultaneously. As shown in FIG. 4 and FIG. 5, the front section member 20 can be rotated in the first rotation direction D1 and the handle member 26 can be rotated in the second rotation direction D2 still, so that an included angle between the front section member 20 and the rear leg member 28 can be decreased, and the first tray 40 can be lowered to be gradually close to the front section member 20. Therefore, the first link 38 can guide the first seat back 34 to be close to the first seat body 36 via the driving member 24; the second link 48 can guide the second seat back 44 to be close to the second seat body 46 via the driving member 24, or the second seat body 46 can be actuated by the driving member 24 to drive relative rotation between the second link 48 and the second seat back 44.

Figure 6:
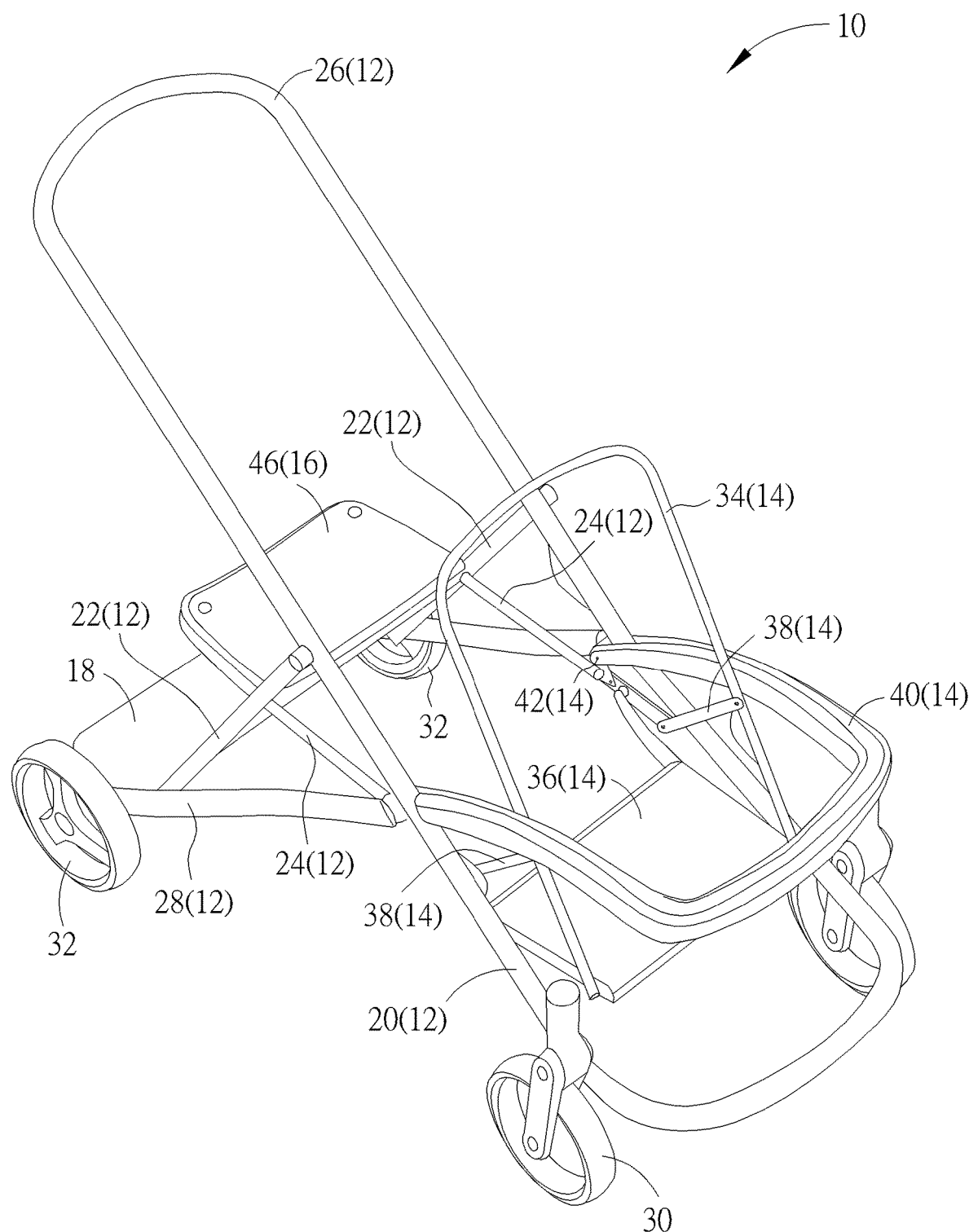
FIG. 6 is a diagram of the multi child stroller in another mode according to the embodiment of the present invention.

Please refer to FIG. 6. FIG. 6 is a diagram of the multi child stroller 10 in another mode according to the embodiment of the present invention. The second seat back 44 and the second link 48 of the second seat 16 can be optionally removed from the multi child stroller 10, and then the second seat body 46 can be used as a bench seat of the multi child stroller 10. The child can sit the second seat body 46 (which means the bench seat) and put feet on the stand platform 18, so that the stand platform 18 can be disposed on position of the rear leg member 28 adjacent to the second seat body 46. Height difference between the second seat body 46 and the stand platform 18 can be designed according to the actual design. Textile goods (not shown in the figures) can be disposed under the second seat body 46 for being storage space of the multi child stroller 10.

In conclusion, the multi child stroller of the present invention can link the driving member with the first seat and the second seat of the stroller frame. When the stroller frame is switched between the folding mode and the service mode, the first seat and the second seat can be simultaneously folded and unfolded via the driving member, so that the stroller frame, the first seat and the second seat can be compactly stored in the folding mode.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A multi child stroller, comprising:
    a stroller frame capable of being switched to a folding mode and a service mode, the stroller frame comprising:
        a front section member;
        a rear section member;
        a driving member movably connected to the rear section member; and
        a handle member, an end of the handle member being rotatably connected to the front section member, a segment of the handle member adjacent to the foresaid end being rotatably connected to the rear section member;
    a first seat, comprising:
        a first seat back;
        a first seat body, two ends of the first body being respectively connected to the driving component and a bottom of the first seat back in a rotatable manner; and
        a first link, two ends of the first link being respectively connected to the driving component and the first seat back in a rotatable manner; and
    a second seat, comprising:
        a second seat back;
        a second seat body detachably and rotatably connected to a bottom of the second seat back, the second seat body being stretched from the driving component; and
        a second link, a first end of the second link being rotatably connected to the second seat back and a second end of the second link being rotatably connected to connection of the rear section member and the handle member;
    wherein when the front section member and the handle member are rotated relative to each other, the driving member is rotated relative to the rear section member, the first link is utilized to rotate the first seat back relative to the first seat body, and the second seat body is utilized to rotate the second seat back relative to the second link.

2. The multi child stroller of claim 1, wherein the driving member is rotatably connected to a rear leg member and is slidably connected to the rear section member.

3. The multi child stroller of claim 2, wherein the rear section member comprises a sliding connection portion where the driving member passes, the driving member is supported by the sliding connection portion and slides relative to the rear section member.

4. The multi child stroller of claim 2, wherein the driving member is assembled with the front section member, the rear section member and the handle member to form a four-bar linkage mechanism.

5. The multi child stroller of claim 1, wherein the stroller frame further comprises a rear leg member rotatably connected to the front section member and the rear section member.

6. The multi child stroller of claim 1, wherein the first seat body is slidably connected to the front section member.

7. The multi child stroller of claim 6, wherein the first seat body comprises a sliding slot, the front section member comprises a connecting portion slidably disposed inside the sliding slot for changing relative position between the front section member and the first seat body.

8. The multi child stroller of claim 1, wherein the first seat further comprises a first tray, a rear end of the first tray is rotatably connected to the front section member.

9. The multi child stroller of claim 8, wherein the first tray is lowered to abut against the front section member when the multi child stroller is switched from the service mode to the folding mode.

10. The multi child stroller of claim 8, wherein the first seat further comprises a first tray linking component, two ends of the first tray linking component are respectively connected to the first tray and the driving member in a rotatably manner.

11. The multi child stroller of claim 1, wherein the first link moves the first seat back close to the first seat body when the stroller frame is in the folding mode.

12. The multi child stroller of claim 1, wherein the first link holds the first seat back at a specific inclined angle when the stroller frame is in the service mode.

13. The multi child stroller of claim 1, wherein the second seat body is integrated with a main section of the driving member monolithically, or fixed to the main section of the driving member.

14. The multi child stroller of claim 1, wherein the second link moves the second seat back close to the second seat body when the stroller frame is in the folding mode.

15. The multi child stroller of claim 1, wherein the second link holds the second seat back at a specific inclined angle when the stroller frame is in the service mode.

16. The multi child stroller of claim 1, wherein the second seat is a bench seat of the multi child stroller when the second seat back and the second link are removed.

17. The multi child stroller of claim 2, wherein the multi child stroller further comprises a stand platform disposed on the rear leg member.

* * * * *